April 20, 1954 W. ALLARD 2,675,714
BRAKE TENSIONING DEVICE
Filed March 2, 1953
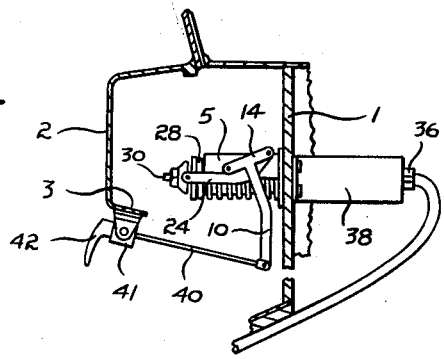
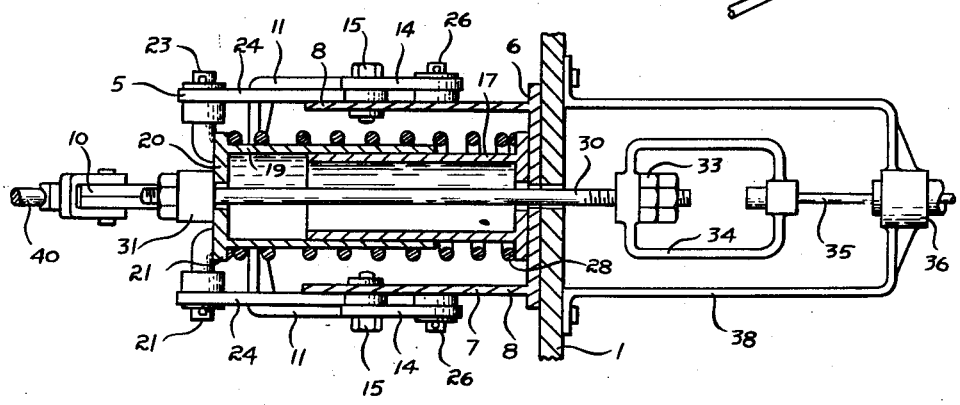
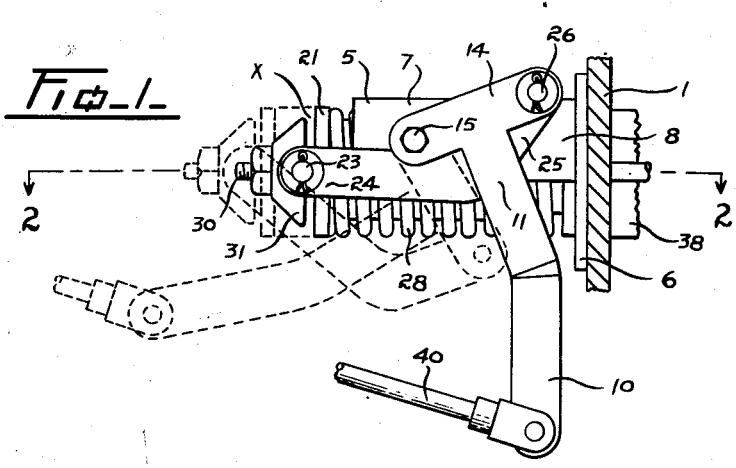
INVENTOR
WILLIAM ALLARD
ATTORNEY Patented Apr. 20, 1954

2,675,714

UNITED STATES PATENT OFFICE 2,675,714

BRAKE TENSIONING DEVICE

William Allard, New Westminster, British Columbia, Canada

Application March 2, 1953, Serial No. 339,841

1 Claim. (Cl. 74—491)

My invention relates to improvements in brake tensioning devices which is particularly adapted for use on the hand brake of a car.

The hand or parking brake is provided generally with some of ratchet mechanism which is intended to enable the brake to be applied to a given tension and so maintain it, so that the car cannot move from its appointed place during the absence of the owner. The car may have been parked in the early morning when the metalwork of the car, including the brake rod or cable, was cold and the hand brake applied with ample force and the brake lever latch engaging a given tooth of the brake quadrant or rack. The tension on the brake may be sufficient to normally hold the car against movement and it may be that the owner could not pull the brake lever far enough to engage another tooth of the brake rack. Incidental to normal morning rise of temperature the brake rod or cable may expand to the point that the brake tension is lessened and the car may move if it is parked on an incline. It is to prevent such a mishap and to overcome the objections above noted that the present invention is designed.

Referring to the accompanying drawings:

Figure 1 is a side elevational view of the invention showing in solid line the position of the parts when the device is in normal position with the brake off and showing in dotted line the position of the parts when the brake is applied.

Figure 2 is a sectional plan view taken on the line 2—2 of Figure 1 and showing the position of the parts when the brake is applied.

Figure 3 is an elevational view showing the device installed behind the instrument panel of a car.

In the drawings like characters of reference indicate corresponding parts in each figure.

The numeral 1 indicates the bulkhead of a motor car and 2 indicates the instrument panel having an inturned lower rim 3. The tensioning device generally indicated by the numeral 5 is provided with a base plate 6 which is secured to the bulkhead 1 or any other convenient structural member of the vehicle. An inverted channel 7 having depending flanges 8 extends from the base plate 6 and hingedly connected to the flanges 8 of said channel is a forked lever 10 having spaced arms 11. The free end of each of the arms 11 is provided with a crosspiece 14, one end of which is connected to a channel flange by a bolt 15 to form the pivotal connection by which the forked lever 10 swings. An inner cylinder 17 is fitted to the base plate 6 and extends horizontally therefrom and slidably mounted upon this cylinder is a sleeve 19 having an outer end closure 20 and a peripheral flange 21. The end closure 20 is fitted with trunnions 23 which pivotally engage the outer ends of a pair of links 24. The links 24 are upwardly bent as at 25 and are connected by pins 26 to the free forward ends of the crosspieces 14 as shown to the right of the arms 11 in Figure 1. A coil spring 28 is fitted around the cylinder 17 and the sleeve 19 and is abutted between the base plate 6 and the flange 21 and is adapted to exert, when expanded as shown in Figure 2, a greater force than is required to hold the brake to which the device 5 is attached firmly applied.

A pull rod 30 is slidably mounted lengthwise of the cylinder 17 and the sleeve 19 and is fitted at its rear end with a crosshead 31 which is adapted to be engaged by the end closure 20 of the sleeve 19 when the brake is applied. The forward end of the pull rod 30 is adjustably connected as at 33 to a yoke 34, which yoke is adapted for connection to a push pull cable 35 the sleeve of which is supported as at 36 in a bracket 38 mounted on the forward side of the bulkhead 1.

The free end of the lever 10 is connected by a rod 40 which is slidably engaged by a suitable fitting 41 from the lower rim 3 of the instrument panel 2. The free end of said rod 40 is fitted with a hand grip 42, see Figure 3, by which to apply or release the hand brake.

It will be understood that the brake to be operated is provided with appropriate spring means to normally hold its band from engagement with the brake drum.

It will be noticed that the crosspieces 14 which operatively connect the channel flanges 8 through the links 24 to the end closure 20 and the movable end of the spring 28 move first to compress the spring until the longitudinal axes of the crosspieces is on "centre" or in line with the pull of the spring and that subsequent movement will allow the spring to elongate to its restricted limit, as shown in Figure 2. As the spring expands it will close the gap X of Figure 1, bringing the end closure 20 into contact with the crosshead 31 and will exert a pull on the pull rod 30 and apply the brake to the required extent to hold the car against rolling movement. An inward thrust upon the hand grip 42 will swing the free ends of the crosspieces 14 in an upward direction past "centre," so that the compression of said spring will prevent a reverse swing of the crosspieces, thus leaving the brake in "off" position. It will be obvious that the relative disposition of the arm 10 to the crosspieces 14 will be altered as required according to the position that the device 5 is to be mounted upon the vehicle.

What I claim as my invention is:

A tensioning device adapted for connection between a brake and its operating lever, said device comprising a stationary base plate, a pair of fulcrum pins carried by the plate in spaced relation thereto, a cylinder extending vertically from the plate beyond the fulcrum pins, a sleeve slidable lengthwise of the cylinder, said sleeve having a flange, a coil spring surrounding the sleeve, said spring being mounted between the flange of the sleeve and the base plate, said sleeve having a pair of trunnions at one end, a pair of crosspieces swingingly mounted upon the fulcrum pins and extending towards the plate, a forked lever connected to said crosspieces to swing them about the fulcrum pins, a pair of links operatively connecting the trunnions with the free ends of the crosspieces and a pull rod having a crosshead at one end adapted to be engaged by the sleeve as the normal spring compression is relieved, said pull rod being adapted for connection to a brake part.

References Cited in the file of this patent

UNITED STATES PATENTS

| Number | Name | Date |
|---|---|---|
| 879,005 | Rockstroh | Feb. 11, 1908 |
| 2,474,598 | Smies | June 28, 1949 |
| 2,562,147 | Kuwayama | July 24, 1951 |
| 2,584,521 | Woodsworth | Feb. 5, 1952 |